US006130767A

United States Patent [19]

King et al.

[11] Patent Number: 6,130,767

[45] Date of Patent: *Oct. 10, 2000

[54] METHOD AND APPARATUS FOR CONDITIONING OPTICAL SOLITONS

[75] Inventors: Jonathan Paul King, Epping; Ian Hardcastle, Harlow; Henry John Harvey, Bishop's Stortford, all of United Kingdom

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,199

[22] PCT Filed: Mar. 4, 1996

[86] PCT No.: PCT/GB96/00480

§ 371 Date: Nov. 13, 1997

§ 102(e) Date: Nov. 13, 1997

[87] PCT Pub. No.: WO96/27956

PCT Pub. Date: Sep. 12, 1996

[30] Foreign Application Priority Data

Mar. 4, 1995 [GB] United Kingdom .................. 9504370

[51] Int. Cl.[7] .................................................. H04B 10/12

[52] U.S. Cl. .......................... 359/173; 359/122; 359/181

[58] Field of Search .................................. 359/181, 161, 359/173; 385/122

[56] References Cited

U.S. PATENT DOCUMENTS

| | | | |
|---|---|---|---|
| 5,115,440 | 5/1992 | Gysel et al. | 372/38 |
| 5,495,360 | 2/1996 | Yoo | 359/248 |
| 5,606,445 | 2/1997 | Kikuchi et al. | 359/161 |
| 5,710,649 | 1/1998 | Mollenauer | 359/123 |

FOREIGN PATENT DOCUMENTS

| | | |
|---|---|---|
| 0555063 | 8/1993 | European Pat. Off. . |

*Primary Examiner*—Leslie Pascal
*Assistant Examiner*—Dalzid Singh
*Attorney, Agent, or Firm*—Lee, Mann, Smith, McWilliams, Sweeney & Ohlson

[57] ABSTRACT

At a receiver a 20 Gbit/s soliton bit stream is demultiplexed into two 10 Gbit/s bit streams using a 2-way splitter, a clock extraction circuit, and a pair of polarization insensitive amplitude modulators exhibiting positive chirp. The outputs of the modulators are fed to detectors via lengths of optical fiber exhibiting normal dispersion thereby producing bit streams with increased mark/space ratio and reduced timing jitter.

8 Claims, 2 Drawing Sheets

METHOD AND APPARATUS FOR CONDITIONING OPTICAL SOLITONS

BACKGROUND OF THE INVENTION

This invention relates to the conditioning of optical soliton bit streams, and finds particular, but not necessarily exclusive, application in the conditioning of such bit streams preparatory for data detection at a receiver.

One of the factors complicating the detection of data in a soliton bit stream at a receiver is that, on the one hand the mark/space ratio of soliton bits is relatively small in order to avoid soliton/soliton interactions, while on the other hand the timing of the solitons is liable to become contaminated by jitter in their transmission from transmitter to receiver.

EP 0 555 063A discloses that the jitter can be removed by the use of a modulator to gate the solitons. For this gating operation, a portion of the incoming signal power is tapped off and used for clock extraction, the extracted clock signal being used to drive the modulator. Jitter is removed from the bit stream by making the period over which the modulator is transmissive short compared with the spread in time-of-arrival (jitter) of the solitons, and accordingly the bits transmitted by the modulator have the timing of the extracted clock signal. In the case of removing jitter from a time division multiplexed soliton bit stream, EP 0 555 063A discloses demultiplexing the bit stream, and employing a separate modulator for each of the separated channels.

SUMMARY OF THE INVENTION

The present invention is directed to an alternative way of ameliorating the problem of jitter and which additionally can have the effect of producing pulse spreading that facilitates the operation of a decision process for determining the presence or absence of a bit within any given bit period.

According to the present invention there is provided a method of conditioning an optical soliton principal bit stream, in which method the solitons are divided into a plurality of interleaved subsidiary bit streams using a plurality of optical amplitude modulators characterised in that the modulators impart chirp to the solitons of the subsidiary bit streams, in that each subsidiary bit stream is launched into an associated length of optical waveguide exhibiting chromatic dispersion, and in that the chirp imparted by the modulators is of opposite sign to that of the chromatic dispersion of the lengths of optical waveguide.

Chirp is a measure of the rate of change of phase with change of light intensity. For the purpose of this specification, positive chirp is defined to mean the condition in which increasing light intensity produces a positive frequency shift (i.e. a decrease of refractive index), and positive dispersion is defined to mean anomalous dispersion.

The invention also provides a conditioner of optical solitons that includes a clock extraction circuit and an optical input optically coupled by means of an n-way optical power splitter with a set of n amplitude modulators, wherein the clock extraction circuit has an output connected to a divide-by-n circuit that is adapted to provide, for the n modulators, a set of n drives interleaved in time, each at a reciprocal-n times the clock output of the clock extraction circuit, which conditioner is characterised in that the modulators exhibit chirp, in that a set of n lengths of optical waveguide exhibiting chromatic dispersion are optically coupled with the n-way splitter via the n modulators, and in that the sign (+ve or −ve) of the chirp of the modulators is the opposite of the sign of the chromatic dispersion of the lengths of optical waveguide.

BRIEF DESCRIPTION OF THE DRAWINGS

There follows a description of the conditioning of soliton pulses at the receiver end of an optical soliton transmission system. This conditioning is effected by means of a conditioner which will be described with reference to the accompanying drawings, in which.

DETAILED DESCRIPTION OF THE EMBODIMENT

Figure 1:
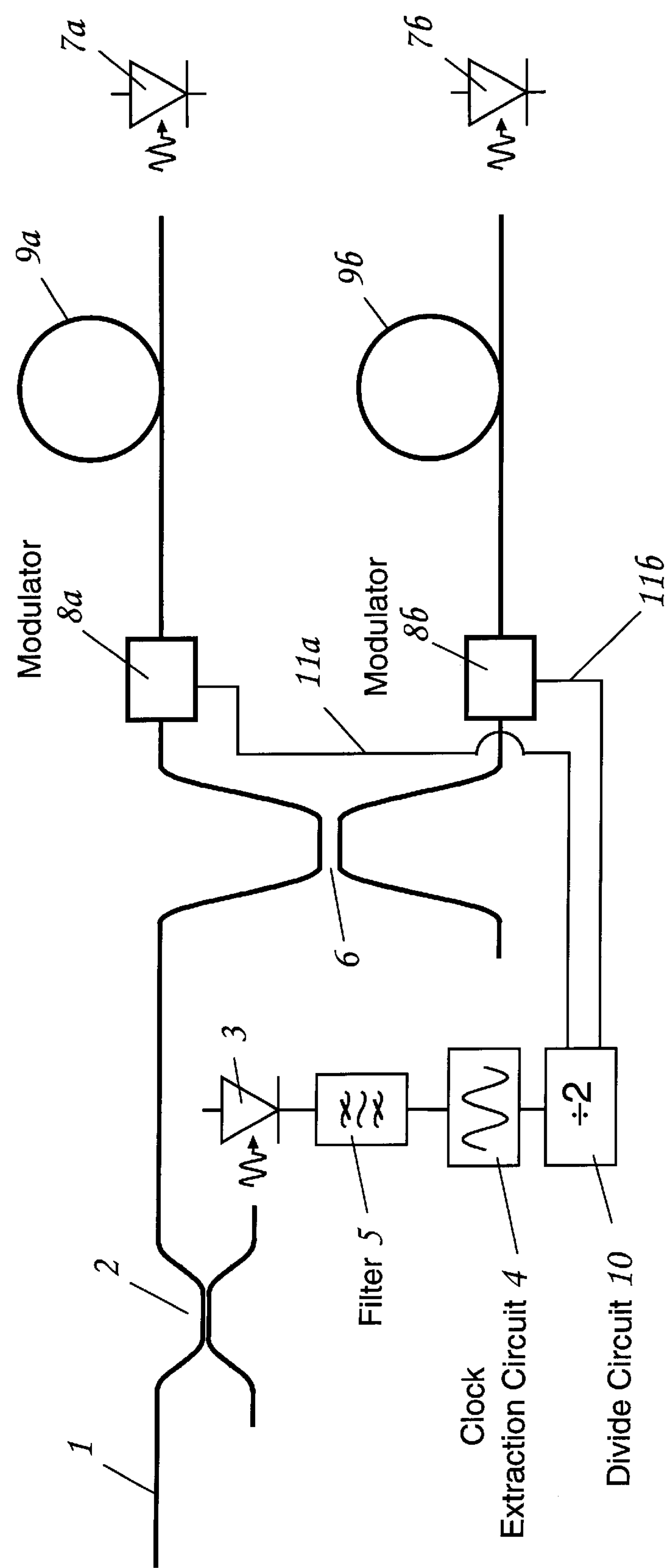
FIG. 1 is a schematic representation of the conditioner, and FIG. 2 also depicts waveforms appearing at different locations in the conditioner of FIG. 1.
Figure 2:
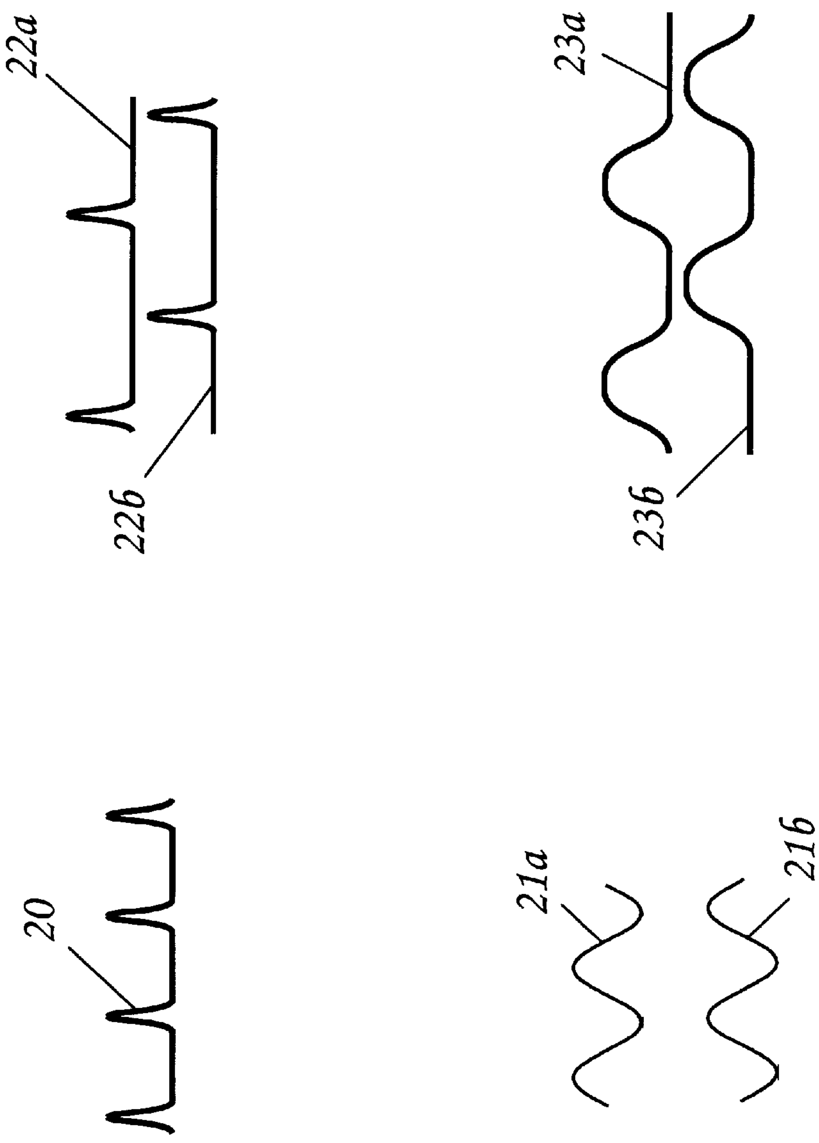

Referring to the drawing, at the receiver end of an optical soliton transmission system, the signal is applied to the conditioner on a single mode optical fibre 1. A coupler 2 is employed to extract a small proportion of the optical signal power for clock extraction purposes. This is fed to a detector 3 to provide an electrical signal fed to a clock extraction circuit 4 via a filter 5.

The remainder of the optical signal on fibre 1 is transmitted to a 1×n optical power splitter 6, in this particular instance the power is split two ways. Each optical output of the splitter is applied to an associated detector 7 via an associated series combination of optical amplitude modulator 8 and length of optical fibre 9 that is normally dispersive to the optical solitons. In the illustrated instance of a 2-way optical power splitter 6, these detectors, modulators and lengths of normally dispersive fibre are respectively designated 7*a*, 7*b*, 8*a*, 8*b*, 9*a* and 9*b*. For a reason explained later, the modulators 8 are preferably modulators exhibiting positive chirp.

The electrical output of the clock extraction circuit 4 is fed to a divide-by-n circuit 10 that provides a set of n electrical outputs 11, one for each modulator 8, that are interleaved in time with $2\pi/n$ phase separation, each at a rate reciprocal-n times the clock rate provided by the clock extraction circuit 4. In this instance the optical power splitter 6 is a 2-way splitter and so the divide circuit 10 is a divide-by-2 circuit having two outputs 11*a* and 11*b*.

The particular conditioner described above with reference to the accompanying drawings is designed for a 20 Gbit/s stream of soliton pulses. The electronic timing circuits (not shown) that are employed to perform timing and threshold decisions on the received pulses (i.e. decide between '1's and '0's in each bit period) have narrow usable time windows at 20 Gbit/s (significantly less than a bit period). This makes the error rate particularly sensitive to pulse jitter. The clock extraction circuit 4, n-way splitter 6, modulators 8 and divide-by-n circuit 10, co-operate to form a fast switching optical demultiplexer, and serve to provide a wider timing window (closer to the full width of a bit period).

Optical soliton propagation occurs when intensity-dependent refractive index effects are balanced by dispersion effects, and such a balance requires the dispersion to be anomalous dispersion. The lengths 9 of optical fibre are lengths of fibre exhibiting normal dispersion, and so the solitonic shape of pulses is not preserved in the propagation of such pulses along this fibre, and accordingly there is significant pulse spreading. This is advantageous because solitons are a small fraction (typically about 20%) of the bit period wide, and pulse arrival may be anywhere within the bit period. To ensure detection of the data, the solitonic pulses first need to be stretched in time to ensure that the stretched pulses will overlap the timing window of the decision circuit. Optical pulse spreading is useful because it makes fast electrical detection less critical. There is an advantage in keeping the receiver chain as simple as possible in order to avoid electrical reflections which can lead to patterning problems.

The use of modulators 8 that exhibit positive chirp is beneficial in reducing timing jitter. Provided that the modulators are driven with generally sinusoidal waveforms, a soliton that arrives early is arriving at a time in which the optical intensity is rising, and therefore that soliton is subject to a positive frequency shift. The pulse then propagates in fibre exhibiting normal dispersion, and so its propagation velocity is smaller than it would have been in the absence of the frequency shift. It is accordingly delayed. Conversely, a soliton that arrives late is subject to a negative frequency shift which serves to increase the propagation velocity, thereby causing the pulse to do some catching up.

Waveform 20 depicts four solitons arriving in four consecutive bit periods at a bit rate of 20 Gbit/s. The clock extract circuit 6 produces a 20 Ghz output which the divide-by-2 circuit 10 converts into two 10 Ghz waveforms 21*a* and 21*b* separated in phase by $\pi$. Their application to the modulators 8 causes each modulator to gate alternate solitons so as to produce the solitonic pulse waveforms 22*a* and 22*b* at the outputs of the two modulators respectively. These pulses are stretched on their propagation through the lengths of fibre 9*a* and 9*b*, and arrive at the detectors 7*c* and 7*b* with the waveforms 23*a* and 23*b* that have a mark/space ratio much closer to 1:1 than that of waveforms 22*a* and 22*b*. (No attempt has been made with these waveforms to illustrate the reduction of jitter consequent upon using modulators 8*a* and 8*b* exhibiting positive chirp).

Since there are generally liable to be uncertainties regarding the polarisation state of solitons arriving at the receiver, it is generally preferred to employ amplitude modulators 8 that are polarisation insensitive. Amplitude modulators that are substantially polarisation insensitive can be constructed that exploit the Franz-Keldysh effect in a p-i-n ridge waveguide structure in inGaAsP with ridge width and active waveguide layer thicknesses tailored to minimise polarisation dependent loss. As a result of the Franz-Keldysh effect, the optical absorption edge of the device is shifted to longer wavelengths by applying an electric field across the waveguide. In operation, the absorption edge is generally on the short wavelength side of the signal. As the electric field is applied, the signal experiences increasing attenuation, and also an associated refractive index change, such a change being described by the Kramers-Kronig relations between real and imaginary components of refractive index. Accordingly, in the general case, the application of the electric field produces a mix of amplitude and phase modulation. If the InGaAsP composition is such as to provide an absorption edge typically 500 nm or more to the short wavelength side of the signal, polarisation independent modulation is predominantly phase modulation with low residual amplitude modulation and low insertion loss. On the other hand, if the InGaAsP composition is such as to provide an absorption edge not more than about 50 nm to the short wavelength side of the signal the insertion loss is significantly greater and the device functions as an amplitude modulator exhibiting negative chirp. Between these extremes the value of the insertion loss is reduced from the high value associated with the small wavelength separation, and more particularly the sign of the chirp changes from negative to positive to provide the type of modulator particularly suitable for the present application.

What we claim is:

1. A method of conditioning an optical soliton principal bit stream in which method the solitons are divided into a plurality of interleaved subsidiary bit streams using a plurality of optical amplitude modulators that impart chirp to the solitons of the subsidiary bit streams, wherein each subsidiary bit stream is launched into an associated length of optical waveguide exhibiting chromatic dispersion, and wherein the sign of the chirp imparted by the modulators is the opposite of the sign of the chromatic dispersion of the lengths of optical waveguide.

2. A method as claimed in claim 1, wherein said principal bit stream is divided into two interleaved subsidiary bit streams.

3. A method of conditioning as claimed in claim 1, wherein the modulators impart positive chirp to the solitons of the subsidiary bit streams.

4. A method as claimed in claim 3, wherein said principal bit stream is divided into two interleaved subsidiary bit streams.

5. A conditioner of optical solitons that includes a clock extraction circuit and an optical input optically coupled by means of an n-way optical power splitter (6) with a set of n amplitude modulators that exhibit chirp, wherein the clock extraction circuit has an output connected to a divide-by-n circuit (10) that is adapted to provide, for the n modulators, a set of n drives interleaved in time, each at a reciprocal-n times the clock output of the clock extraction circuit, wherein a set of n lengths of optical waveguide exhibiting chromatic dispersion are optically coupled with the n-way splitter via the n modulators, and wherein the sign of the chirp of the modulators is the opposite of the sign of the chromatic dispersion of the lengths of optical waveguide.

6. A soliton conditioner as claimed in claim 5, wherein the n-way optical power splitter is a 2-way power splitter.

7. A soliton conditioner as claimed in claim 5, wherein the modulators exhibit positive chirp.

8. A soliton conditioner as claimed in claim 7, wherein the n-way optical power splitter is a 2-way power splitter.

* * * * *